US010195543B2

(12) United States Patent
Wilson et al.

(10) Patent No.: US 10,195,543 B2
(45) Date of Patent: Feb. 5, 2019

(54) METHODS AND SYSTEMS FOR TREATING A SWITCHABLE POLARITY MATERIAL, AND RELATED METHODS OF LIQUID TREATMENT

(71) Applicant: BATTELLE ENERGY ALLIANCE, LLC, Idaho Falls, ID (US)

(72) Inventors: Aaron D Wilson, Idaho Falls, ID (US); Daniel S Wendt, Idaho Falls, ID (US); Christopher J Orme, Firth, ID (US); Gregory L Mines, Idaho Falls, ID (US); Michael G Jones, Chubbuck, ID (US); Birendra Adhikari, Ammon, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 193 days.

(21) Appl. No.: 15/177,528

(22) Filed: Jun. 9, 2016

(65) Prior Publication Data

US 2017/0354904 A1     Dec. 14, 2017

(51) Int. Cl.
*B01D 19/00*     (2006.01)
*B01D 53/22*     (2006.01)
(Continued)

(52) U.S. Cl.
CPC ..... *B01D 19/0031* (2013.01); *B01D 19/0073* (2013.01); *B01D 53/225* (2013.01);
(Continued)

(58) Field of Classification Search
CPC .. B01D 19/0031; B01D 69/145; B01D 69/02; B01D 69/04; B01D 19/0073;
(Continued)

(56) References Cited

U.S. PATENT DOCUMENTS 5,281,254 A *   1/1994   Birbara .............. B01D 53/1493
                                                                     95/44
6,138,995 A     10/2000   Page
                 (Continued)

FOREIGN PATENT DOCUMENTS

WO     2012079175 A1     8/2011

OTHER PUBLICATIONS

Publication by Aaron Wilson and Federick Stewart, "Structure-function study of tertiary amines as switchable polarity solvents", published by Royal Society of Chemistry, 2014, vol. 4, pp. 11039-11049.*
Publication by Benjamin Joseph Coscia, "Membrane Compatibility with Switchable Polarity Draw Solutions for use in Forward Osmosis Applications", published by University of Connecticut, May 1, 2014, pp. 1-15.*
ASTM International, "Standard Practice for Surface Wettability of Coatings, Substrates and Pigments by Advancing Contact Angle Measurement", Designation: D7334-08, (2008), 3 pages.

*Primary Examiner* — Joseph W Drodge
(74) *Attorney, Agent, or Firm* — TraskBritt

(57) ABSTRACT

A method of treating a switchable polarity material comprises introducing a first feed stream comprising a solvent and a non-polar form of the switchable polarity material to a first side of a gas diffusion membrane. A second feed stream comprising an acid gas is introduced to a second side of the gas diffusion membrane opposing the first side of the gas diffusion membrane. Molecules of the acid gas of the second feed stream are diffused across the gas diffusion membrane and into the first feed stream to form a product stream comprising a polar form of the switchable polarity material. A treatment system for a switchable polarity material, and a method of liquid treatment are also described.

23 Claims, 7 Drawing Sheets

(51) Int. Cl.
*B01D 53/62* (2006.01)
*B01D 69/02* (2006.01)
*B01D 69/04* (2006.01)
*B01D 69/14* (2006.01)

(52) U.S. Cl.
CPC ......... *B01D 53/228* (2013.01); *B01D 53/229* (2013.01); *B01D 53/62* (2013.01); *B01D 69/02* (2013.01); *B01D 69/04* (2013.01); *B01D 69/145* (2013.01); *B01D 2251/80* (2013.01); *B01D 2257/504* (2013.01); *B01D 2313/42* (2013.01); *B01D 2325/38* (2013.01)

(58) Field of Classification Search
CPC ............... B01D 53/62; B01D 2251/80; B01D 2313/42; B01D 2325/38; B01D 2257/504; B01D 11/04; B01D 11/0403; B01D 11/0415; B01D 53/005; B01D 53/22; B01D 53/225; B01D 53/228; B01D 53/229; B01D 61/002; B01D 61/005; B01D 61/025; B01D 61/04; B01D 61/10; B01D 61/58; B01D 2311/04; B01D 2311/103; B01D 2311/2653; B01D 2311/2661; B01D 2311/2665; B01D 53/226; C02F 1/02; C02F 1/041; C02F 1/046; C02F 1/20; C02F 1/225; C02F 1/22; C02F 1/44; C02F 1/441; C02F 1/445
USPC ...... 210/635, 640, 642, 644, 650; 95/45, 46, 95/51
See application file for complete search history.

(56) References Cited

U.S. PATENT DOCUMENTS

| | | | |
|---|---|---|---|
| 6,158,721 A | 12/2000 | Katou et al. | |
| 6,712,342 B2 | 3/2004 | Bosko | |
| 7,132,090 B2 | 11/2006 | Dziedzic et al. | |
| 7,771,599 B1 | 8/2010 | Choi et al. | |
| 7,982,069 B2 | 7/2011 | Jessop et al. | |
| 8,313,557 B2 | 11/2012 | Willauer et al. | |
| 8,580,124 B2* | 11/2013 | Jessop | C07C 257/14 203/39 |
| 9,399,194 B2* | 7/2016 | Wilson | B01D 61/005 |
| 2006/0144789 A1* | 7/2006 | Cath | B01D 61/002 210/641 |
| 2011/0203994 A1* | 8/2011 | McGinnis | B01D 61/002 210/650 |
| 2011/0257334 A1* | 10/2011 | Jessop | C07C 257/14 525/50 |
| 2013/0048561 A1 | 2/2013 | Wilson et al. | |
| 2013/0256228 A1* | 10/2013 | Bharwada | C02F 1/445 210/644 |
| 2013/0319230 A1 | 12/2013 | Patel | |
| 2016/0002082 A1* | 1/2016 | Yin | C02F 1/441 210/638 |
| 2016/0016115 A1* | 1/2016 | Wilson | B01D 61/005 210/648 |
| 2016/0152491 A1* | 6/2016 | Rajagopalan | C02F 1/445 210/644 |

\* cited by examiner

METHODS AND SYSTEMS FOR TREATING A SWITCHABLE POLARITY MATERIAL, AND RELATED METHODS OF LIQUID TREATMENT

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to methods and systems for treating switchable polarity materials, and to related methods of liquid treatment. More specifically, embodiments of the disclosure relate to methods and systems of producing a polar form of a switchable polarity material using at least one gas diffusion membrane apparatus, and to related methods of liquid treatment.

BACKGROUND

Switchable polarity materials (SPMs) exhibit characteristics useful in a wide range of applications. As used herein, the term "switchable polarity material" means and includes a material that is configured to undergo a polarity shift when subjected to a change in reaction conditions (e.g., the addition or removal of a gas). For example, an SPM may switch (e.g., convert) from a non-polar form (e.g., a hydrophobic from) to a polar form (e.g., a hydrophilic form) when subjected to the change in process conditions, or may switch from a polar form to a non-polar form when subjected to the change in process conditions. The non-polar form and polar form of the SPM may each have a different solubility in a solvent, such as water and/or an alcohol. U.S. patent application Ser. No. 13/480,053, filed May 24, 2012, the disclosure of which is hereby incorporated herein in its entirety by this reference, describes methods and systems for liquid treatment utilizing various switchable polarity materials.

Unfortunately, conventional methods and systems for producing a polar form of various SPMs can be excessively time consuming, inefficient, and/or complicated. For example, conventional methods and systems for producing the polar form of various SPMs typically employ batch processes wherein gaseous carbon dioxide ($CO_2$) is bubbled through a stirred heterogeneous mixture of water and the non-polar form of the SPM. Such processes rely on relatively inefficient mass transfer between the gaseous $CO_2$ bubbles and the heterogeneous mixture of water and the non-polar form of the SPM, and can take relatively long periods of time (e.g., weeks) to form relatively small batches (e.g., 0.5 liter batches) of product exhibiting desirable concentrations of the polar form of the SPM. Accordingly, such processes and systems can be insufficient for the needs of many industrial applications.

It would be desirable to have new methods and systems for producing polar forms of SPMs. It would further be desirable if the new methods and systems facilitated increased conversion efficiency, and were relatively inexpensive and simple in operation.

BRIEF SUMMARY

Embodiments described herein include methods and systems for treating switchable polarity materials, and to related methods of treating a liquid. In accordance with one embodiment described herein, a method of treating a switchable polarity material comprises introducing a first feed stream comprising a solvent and a non-polar form of the switchable polarity material to a first side of a gas diffusion membrane. A second feed stream comprising an acid gas is introduced to a second side of the gas diffusion membrane opposing the first side of the gas diffusion membrane. Molecules of the acid gas of the second feed stream are diffused across the gas diffusion membrane and into the first feed stream to form a product stream comprising a polar form of the switchable polarity material.

In additional embodiments, a treatment system for a switchable polarity material comprises a source of a non-polar form of the switchable polarity material, a source of an acid gas, and a gas diffusion membrane apparatus in fluid communication with the source of the non-polar form of the switchable polarity material and the source of the acid gas and comprising a housing structure and a gas diffusion membrane within the housing structure. The gas diffusion membrane apparatus is configured to separately receive the non-polar form of the switchable polarity material and the acid gas on opposing sides of the gas diffusion membrane, and to diffuse molecules of the acid gas through the gas diffusion membrane to convert at least some of the non-polar form of the switchable polarity material and into a polar form of the switchable polarity material.

In further embodiments, a method of liquid treatment comprises delivering a mixture comprising at least one liquid solvent and one or more of an amine compound, an amidine compound, and a guanidine compound to a first side of a gas diffusion membrane. Gaseous carbon dioxide is delivered to a second side of the gas diffusion membrane. Molecules of the gaseous carbon dioxide are diffused through the gas diffusion membrane and into the mixture to react with the mixture and form one or more of an aminium bicarbonate, an aminium alkyl carbonate, an amidinium bicarbonate, an aminium alkyl carbonate, a guanidinium bicarbonate, and a guanidinium alkyl carbonate.

DETAILED DESCRIPTION

Figure 1:
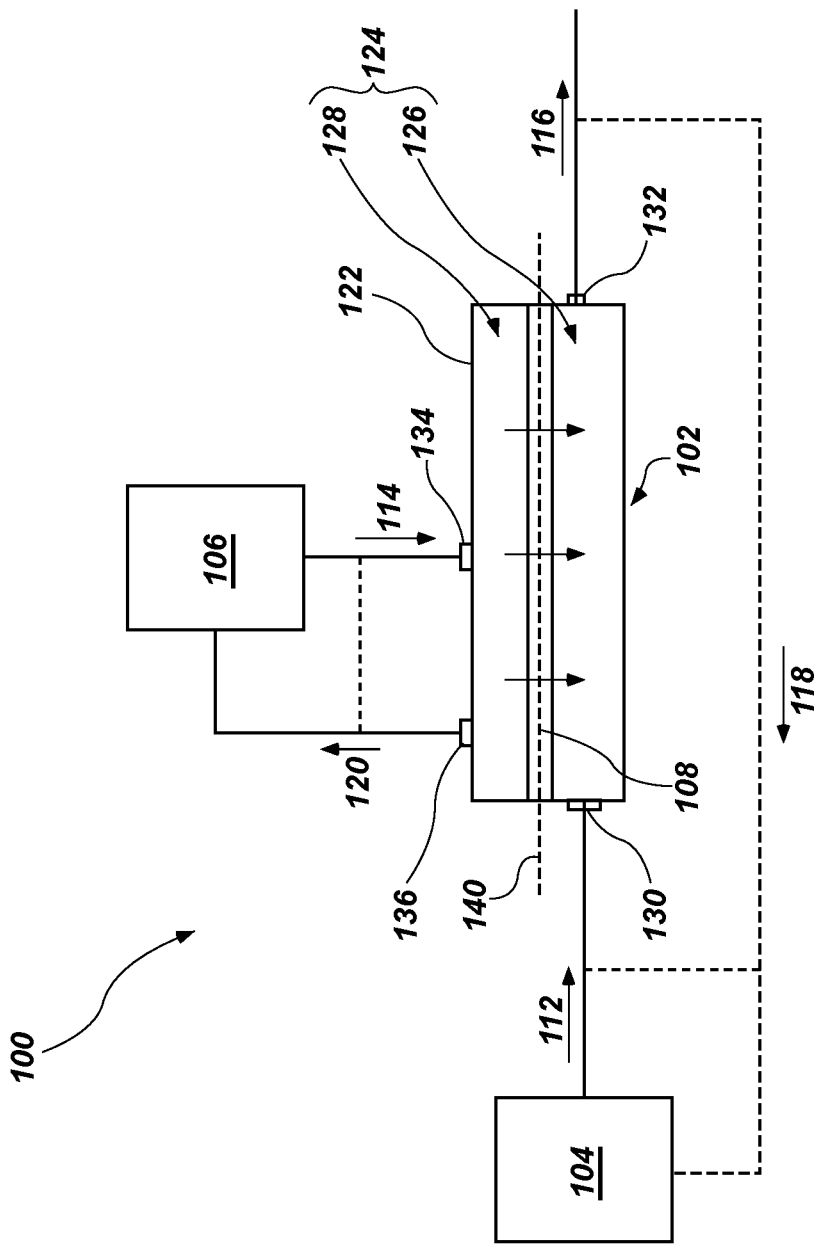
FIG. 1 is a simplified schematic view of a system for treating an SPM, in accordance with an embodiment of the disclosure.

Methods and systems for treating an SPM are disclosed, as are related methods of liquid treatment. In some embodiments, a method of treating an SPM includes delivering each of at least one SPM feed stream and at least one acid gas feed stream into a gas diffusion membrane apparatus including a housing structure and at least one gas diffusion membrane contained within the housing structure. The SPM feed stream includes at least one solvent, and a non-polar form of at least one SPM. The acid gas feed stream includes at least one acid gas. The SPM feed stream is introduced to a first side of the gas diffusion membrane, and the acid gas feed stream is introduced to a second, opposing side of the gas diffusion membrane. The conditions (e.g., material composition, pressure, temperature, flow rate) of the SPM feed stream and the acid gas feed stream are selected and controlled relative to one another and the properties (e.g., size, shape, porosity, material composition, material distribution, quantity, position) of the gas diffusion membrane to facilitate the diffusion of molecules of acid gas from the acid gas feed stream, through the gas diffusion membrane, and into the SPM feed stream to produce at least one SPM product stream including a polar form of the SPM. The methods and systems of the disclosure may be more efficient (e.g., increasing conversion efficiency; reducing equipment, material, and/or energy requirements; etc.), may provide enhanced process control (e.g., more precise control of flow rates of fluids on opposing sides of a membrane), may have greater equipment orientation flexibility, and/or may be less complicated as compared to conventional methods and conventional systems for treating an SPM.

The following description provides specific details, such as stream compositions, catalyst types, and process conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system. Moreover, elements in common between figures may retain the same numerical designation.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

One embodiment of the disclosure will now be described with reference to FIG. 1, which schematically illustrates a treatment system 100 for an SPM. The treatment system 100 may be used to convert a non-polar form (e.g., a hydrophobic from) of an SPM into a polar form (e.g., a hydrophilic form) of the SPM. As shown in FIG. 1, the treatment system 100 may include at least one SPM source 104, at least one acid gas source 106, and at least one gas diffusion membrane apparatus 102 in fluid communication with the SPM source 104 and the acid gas source 106 and comprising a housing structure 122 (e.g., shell) and at least one gas diffusion membrane 108 contained within the housing structure 122. The gas diffusion membrane 108 may be configured and operated to receive at least one SPM feed stream 112 from the SPM source 104 and at least one acid gas feed stream 114 from the acid gas source 106, and to diffuse molecules of acid gas from the acid gas feed stream 114 across the gas diffusion membrane 108 and into the SPM feed stream 112 to react with components thereof and form at least one SPM product stream 116 including the polar form of the SPM. With the description provided below, it will be readily apparent to one of ordinary skill in the art that the methods and systems described herein may be used in various systems. In other words, the methods and systems of the disclosure may be used whenever it is desired to convert a non-polar form of an SPM into a polar form of the SPM.

The SPM source 104 may comprise at least one apparatus configured and operated to store and/or produce a non-polar form of at least one SPM. By way of non-limiting example, the SPM source 104 may comprise one or more of a storage vessel (e.g., a tank) configured and operated to contain at least the non-polar form of the SPM, and an apparatus (e.g. a degassing apparatus) configured and operated at least to convert the polar form of the SPM into the non-polar form of the SPM. In some embodiments, the SPM source 104 comprises a storage tank.

The non-polar form of the SPM may comprise one or more of an amine compound, an amidine compound, and a guanidine compound that is substantially insoluble with the at least one solvent. The general structure of each of an amine compound, an amidine compound, and a guanidine compound is, respectively, shown below:

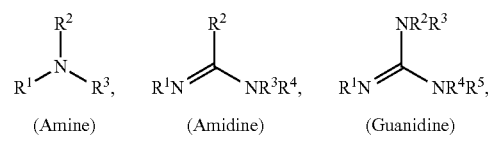

where $R^1$, $R^2$, $R^3$, $R^4$, and $R^5$ are independently hydrogen; a substituted or unsubstituted alkyl group (i.e., linear, branched, or cyclic) containing from 1 carbon atom to 10 carbon atoms; a substituted or unsubstituted $C_nSi_m$ group where n and m are independently an integer from 0 to 10 and n+m is an integer from 1 to 10; and a substituted or unsubstituted aryl group or heteroaryl group that may contain at least one $\{-Si(R^6)_2-O-\}$ where $R^6$ is a substituted or unsubstituted alkyl, aryl, heteroaryl, or alkoxy group. If a group is substituted, the substituent may be an alkyl, alkenyl, alkynl, alky halide, aryl, aryl halide, heteroaryl, non-aromatic ring, $Si(alkyl)_3$, $Si(alkoxy)_3$, alkoxy, amino, ester, amide, thioether, alkylcarbonate, or thioester group. Optionally, two or more of the $R^1$, $R^2$, $R^3$, $R^4$, and $R^5$ groups may form a ring structure (e.g., an alicylic group, or a aryl group) with each other.

The non-polar form of the SPM may have a nitrogen atom to carbon atom ratio with a range of from about 1:2 to about 1:15. If the non-polar form of the SPM comprises at least one amine compound, the amine compound may comprise a tertiary amine fully saturated at the nitrogen position. The amine compound may be linear, cyclic, or branched and may include a single nitrogen atom or multiple nitrogen atoms. The amine compound may be a monoamine compound (i.e., a compound including one amino group) or may be a polyamine compound (i.e., a compound including two or more amino groups). In some embodiments, the amine compound has one nitrogen atom and less than or equal to eleven (15) carbon atoms. Non-limiting examples of suitable amine compounds include dicyclohexylmethylamine, tri-n-pentylamine, 1-cyclohexylpiperidine, cyclohexyldimethylamine, 1-butylpyrrolidine, 1-ethylpiperidine, N,N-diethylcyclohexylamine, triethylamine, N,N-dibutylmethylamine, 2-ethyl-hexyl-N,N-dimethylamine, N-benzyldimethylamine, N,N-dimethyl-2-phenylethanamine, N,N-dimethyl-3-phenylpropanamine, N-methyldipropylamine, N-butyldiethylamine, N-butyldimethylamine, N,N-dimethylpentylamine, N-heptyldimethylamine, N,N-dimethyloctylamine, N,N-dimethylnonanamine, N-decyldimethylamine, and N-hexyldimethylamine. Non-limiting examples of suitable amidine compounds include N,N,N'-tripropylbutanamidine, N,N,N-tributylpentanamidine, and 1,8-diazabicyclo[5.4.0]undec-7-ene (DBU). Non-limiting examples of suitable guanidine compounds include 1,1,3,3-tetramethyl-2-phenylguanidine, 2-(2-fluorophenyl)-1,1,3,3-tetramethylguanidine, 1,1,3,3-tetraethyl-2-hexylguanidine, 2-butyl-1,1,3,3-tetraethylguanidine, and 2-hexyl-1,1,3,3-tetramethylguanidine. Suitable amine compounds, amidine compounds, and guanidine compounds are commercially available from numerous sources, such as from Sigma-Aldrich Company (St. Louis, Mo.). In some embodiments, the non-polar form of the SPM comprises 1-cyclohexylpiperidine, which has the following structure:

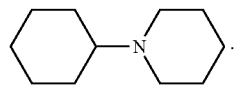 [SMILES: C1CCC(N2CCCCC2)CC1]

The SPM feed stream 112 may be formed of and include the non-polar form of the SPM, at least one solvent, and, optionally, at least one additive. The solvent and the additive (if any) may be included with the non-polar form of the SPM in the SPM source 104, or may be subsequently combined (e.g., mixed) with the non-polar form of the SPM exiting the SPM source 104. In some embodiments, the non-polar form of the SPM, the solvent, and the additive (if any) of the SPM feed stream 112 are obtained together from the SPM source 104.

The solvent of the SPM feed stream 112 may comprise at least one flowable material (e.g., fluid, granular, or suspended material) that is compatible with the other components (e.g., the non-polar form of the SPM, the additives (if any), etc.) of the SPM feed stream 112. As used herein, the term "compatible" means that a material does not undesirably react, decompose, or absorb another material, and also that the material does not undesirably impair the chemical and/or mechanical properties of the another material. The solvent may comprise a liquid material, a gaseous material, or a combination thereof. In some embodiments, the solvent comprises a liquid material. The solvent may, for example, comprise one or more of an aqueous liquid material (e.g., water), an organic liquid material (e.g., an alcohol, such as methanol, ethanol, propanol, butanol, hexanol, octanol, combinations thereof; etc.), and a material (e.g., a liquid, a gel, a solute, a heterogeneous material, a suspended solid, a separated solid, etc.) having at least one hydroxyl functional group. In some embodiments, the solvent comprises one or more of water ($H_2O$) and an alcohol.

The additive of the SPM feed stream 112, if any, may comprise one or more of at least one homogeneous material and at least one heterogeneous material. Non-limiting examples of homogeneous materials include inorganic materials (e.g., water soluble minerals, water soluble compounds such as salts), organic materials (e.g., pharmaceuticals, plasticizers, solvents, industrial chemicals, and organics found in produced water), and inorganic/organic hybrid materials (e.g., coordination complexes, and organometallic complexes such as dimethyl mercury). Non-limiting examples of heterogeneous materials include algae, microbes, small particulate matter, undissolved sewage material, nanoparticles, polymers, and food product solution materials, such as fruit juices. If included in the SPM feed stream 112, the additive may be present as a contaminant or impurity of the solvent (e.g., where it is desired to purify or concentrate the solvent), or the solvent may be present as a contaminant or impurity of the additive (e.g., where it is desired to purify or concentrate the additive).

A concentration of the non-polar form of the SPM in the SPM feed stream 112 may be tailored to a desired concentration of the polar form (e.g., hydrophilic form) of the SPM in the SPM product stream 116, which may at least partially depend on a desired downstream use of the SPM product stream 116. The SPM feed stream 112 may, for example, include a sufficient concentration of the non-polar form of the SPM to form an SPM product stream 116 having a concentration of the polar form of the SPM within a range of from a lowest effective concentration of the polar form of the SPM for the desired downstream use to a solubility limit of the polar form of the SPM in the SPM product stream 116. The concentration of the non-polar form of the SPM in the SPM feed stream 112 able to facilitate a sufficient concentration of the polar form of the SPM in the SPM product stream 116 for a desired downstream use of the SPM product stream 116 may at least partially depend on the properties (e.g., material compositions, viscosities, pressures, temperatures, flow rates, etc.) of the SPM feed stream 112 and the acid gas feed stream 114, and the properties (e.g., structural configuration, including individual component configurations; material compositions; etc.) of the gas diffusion membrane apparatus 102. As a non-limiting example, a concentration of the non-polar form of the SPM in the SPM feed stream 112 may be within a range of from about 0.1 mol/kg to about 20.0 mol/kg, such as from about 0.5 mol/kg to about 15.0 mol/kg, from about 1.0 mol/kg to about 10.0 mol/kg, or from about 1.0 mol/kg to about 5.0 mol/kg. The concentration of the non-polar form of the SPM entering the gas diffusion membrane apparatus 102 may be controlled as desired by adjusting one or more of an amount of the non-polar form of the SPM in the SPM feed stream 112, an amount of the solvent in the SPM feed stream 112, and an amount of the additive (if any) within the SPM feed stream 112.

The SPM feed stream 112 may be substantially homogeneous (e.g., each of the components of the SPM feed stream 112 may be uniformly dispersed throughout the SPM feed stream 112), or may be heterogeneous (e.g., at least one of the components of the SPM feed stream 112 may be non-uniformly dispersed throughout the SPM feed stream 112). In some embodiments, the SPM feed stream 112 is substantially homogeneous.

A single (e.g., only one) SPM feed stream 112 may be directed into the gas diffusion membrane apparatus 102, or multiple (e.g., more than one) SPM feed streams 112 may be directed into the gas diffusion membrane apparatus 102. If a single SPM feed stream 112 is directed into the gas diffusion membrane apparatus 102, the SPM feed stream 112 may comprise a mixture of materials (e.g., a mixture comprising the non-polar form of the SPM, the solvent, and the additive (if any)). If multiple SPM feed streams 112 are directed into the gas diffusion membrane apparatus 102, each of the SPM feed streams 112 may exhibit substantially the same properties (e.g., the same material composition, including the same type and amount of each of the non-polar form of the SPM, the solvent, and the additive (if any); the same temperature; the same pressure; the same flow rate; etc.), or at least one of the SPM feed streams 112 may exhibit one or more different properties (e.g., one or more of a different material composition, such as a different type and/or a different amount of one or more of the non-polar form of the SPM, the solvent, and the additive (if any); a different temperature; a different pressure; a different flow rate; etc.) than at least one other of the SPM feed streams 112. Each of the multiple SPM feed streams 112 may independently comprise a single material (e.g., the non-polar form of the SPM, the solvent, or the additive), each of the multiple SPM feed streams 112 may independently comprise a mixture of materials (e.g., a mixture of two or more of the non-polar form of the SPM, the solvent, and the additive), or at least one of the multiple SPM feed streams 112 may comprise a single material and at least one other of the multiple SPM feed streams 112 may comprise a mixture of materials. At least some of the multiple SPM feed streams 112 may be combined with one another prior to being directed into the gas diffusion membrane apparatus 102, and/or at least some of the multiple SPM feed streams 112 may be directed into the gas diffusion membrane apparatus 102 separately (e.g., discretely, individually, etc.) and combined with one another within gas diffusion membrane apparatus 102. If at least some of the multiple SPM feed streams 112 are separately directed into the gas diffusion membrane apparatus 102, the multiple SPM feed streams 112 may be directed into the gas diffusion membrane apparatus 102 simultaneously, non-simultaneously, or a combination thereof. In some embodiments, a single SPM feed stream 112 comprising a mixture of materials (e.g., the non-polar form of at least one SPM, the solvent, and, optionally, the additive) is directed into the gas diffusion membrane apparatus 102.

The acid gas source 106 may comprise at least one apparatus configured and operated to store and/or produce at least one acid gas. By way of non-limiting example, the acid gas source 106 may comprise one or more of a storage vessel (e.g., a tank) configured and operated to contain the acid gas, and an apparatus (e.g., a combustion apparatus) configured and operated to produce the acid gas. In some embodiments, the acid gas source 106 comprises a storage vessel. The acid gas may comprise at least one gaseous material that can convert the non-polar form of the SPM of the SPM feed stream 112 into the polar form of the SPM. The acid gas may, for example, comprise one or more of gaseous carbon dioxide ($CO_2$), gaseous carbon disulfide ($CS_2$), and gaseous carbonyl sulfide (COS). In some embodiments, the acid gas is formed of and includes gaseous $CO_2$.

The acid gas feed stream 114 may be formed of and include the acid gas from the acid gas source 106. A single (e.g., only one) acid gas feed stream 114 may be may be directed into the gas diffusion membrane apparatus 102, or multiple (e.g., more than one) acid gas feed streams 114 may be directed into the gas diffusion membrane apparatus 102. If a single acid gas feed stream 114 is directed into the gas diffusion membrane apparatus 102, the acid gas feed stream 114 may comprise a single material (e.g., one of $CO_2$, $CS_2$, and COS), or may comprise a mixture of materials (e.g., a mixture of two or more of $CO_2$, $CS_2$, and COS). If multiple acid gas feed streams 114 are directed into the gas diffusion membrane apparatus 102, each of the acid gas feed streams 114 may exhibit substantially the same properties (e.g., the same material composition, including the same type and amount of acid gas; the same temperature; the same pressure; the same flow rate; etc.), or at least one of the acid gas feed streams 114 may exhibit one or more different properties (e.g., one or more of a different material composition, such as a different type and/or a different amount of acid gas; a different temperature; a different pressure; a different flow rate; etc.) than at least one other of the acid gas feed streams 114. Each of the multiple acid gas feed streams 114 may independently comprise a single material (e.g., one of $CO_2$, $CS_2$, and COS), each of the multiple acid gas feed streams 114 may independently comprise a mixture of materials (e.g., a mixture of two or more of $CO_2$, $CS_2$, and COS), or at least one of the multiple acid gas feed streams 114 may comprise a single material and at least one other of the multiple acid gas feed streams 114 may comprise a mixture of materials. At least some of the multiple acid gas feed streams 114 may be combined with one another prior to being directed into the gas diffusion membrane apparatus 102, and/or at least some of the multiple acid gas feed streams 114 may be directed into the gas diffusion membrane apparatus 102 separately (e.g., discretely, individually, etc.) and combined with one another within gas diffusion membrane apparatus 102. If at least some of the multiple acid gas feed streams 114 are separately directed into the gas diffusion membrane apparatus 102, the multiple acid gas feed streams 114 may be directed into the gas diffusion membrane apparatus 102 simultaneously, non-simultaneously, or a combination thereof. In some embodiments, a single acid gas feed stream 114 comprising a single material (e.g., $CO_2$) is directed into the gas diffusion membrane apparatus 102.

The SPM feed stream 112 and the acid gas feed stream 114 may each independently exhibit a temperature, a pressure, and a flow rate facilitating the formation of a predetermined concentration of the polar form of the SPM in the SPM product stream 116 in a predetermined amount of time by way of interactions between components (e.g., the non-polar form of the SPM, the solvent, etc.) of the SPM feed stream 112 and the acid gas of the acid gas feed stream 114 within the gas diffusion membrane apparatus 102. The temperature(s), pressure(s), and flow rate(s) of the SPM feed stream 112 and the acid gas feed stream 114 may be selected relative to one another and at least partially based on the configuration of the gas diffusion membrane apparatus 102 (e.g., including the sizes, shapes, material compositions, and arrangements of the components thereof, such as the size, shape, material composition, and position of the gas diffusion membrane 108). In some embodiments, the temperature(s), pressure(s), and flow rate(s) of the SPM feed stream 112 and the acid gas feed stream 114 are controlled (e.g., selected and/or adjusted) to facilitate the formation of an SPM product stream 116 including greater than or equal to about 4.0 mol/kg of the polar form of the SPM in less than or equal to about 4 hours (e.g., less than or equal to about 3 hours, less than or equal to about 2 hours, less than or equal to about 1 hour, etc.) residence time in the gas diffusion membrane apparatus 102.

The temperature(s) of the SPM feed stream 112 and the acid gas feed stream 114 may independently be selected relative to one another, the material compositions of the SPM feed stream 112 and the acid gas feed stream 114, and the configuration of the gas diffusion membrane apparatus 102 (e.g., including component sizes, component shapes, component material compositions, and component arrangements thereof) to control one or more of the viscosity of the SPM feed stream 112, chemical reaction rates during the formation of the polar form of the SPM within the gas diffusion membrane apparatus 102, the solubility of the acid gas of the acid gas feed stream 114 in the SPM feed stream 112, and the stability of the polar form of the SPM in the SPM product stream 116. The temperature(s) of the SPM feed stream 112 and the acid gas feed stream 114 may, for example, be independently selected such that the production of the SPM product stream 116 including the polar form of the SPM is limited by chemical reaction rate. By way of non-limiting example, temperature(s) of the SPM feed stream 112 and the acid gas feed stream 114 may be independently selected (and, optionally, varied) such that a temperature of the SPM product stream 116 emerging from the gas diffusion membrane apparatus 102 will be within a range of from about 10° C. to about 40° C., such as from about 10° C. to about 30° C., or from about 20° C. to about 30° C. In some embodiments, each of the SPM feed stream 112 and the acid gas feed stream 114 independently exhibit a temperature within a range of from about 20° C. to about 30° C. The SPM feed stream 112 and the acid gas feed stream 114 may each independently exhibit a substantially constant (e.g., substantially invariable, substantially unchanging, etc.) temperature over the period of time the SPM feed stream 112 and the acid gas feed stream 114 are directed into the gas diffusion membrane apparatus 102, or one or more of the SPM feed stream 112 and the acid gas feed stream 114 may exhibit variable (e.g., non-constant, changing, etc.) temperatures over the period of time the SPM feed stream 112 and the acid gas feed stream 114 are directed into the gas diffusion membrane apparatus 102.

The pressure(s) of the SPM feed stream 112 and the acid gas feed stream 114 may independently be selected relative to one another, the material compositions of the SPM feed stream 112 and the acid gas feed stream 114, and the configuration of the gas diffusion membrane apparatus 102 to permit molecules of the acid gas of the acid gas feed stream 114 to pass through the gas diffusion membrane 108 of the gas diffusion membrane apparatus 102 and into the SPM feed stream 112 without the formation of bubbles of the acid gas in at least the SPM feed stream 112. By way of non-limiting example, a pressure differential across the gas diffusion membrane 108 provided by the pressure of the SPM feed stream 112 relative to the pressure of the acid gas feed stream 114 may be within a range of from about 0.1 pound per square inch (psi) to about 150.0 psi, such as from about 1.0 psi to about 100.0 psi, from about 1.0 psi to about 75.0 psi, from about 1.0 psi to about 50 psi, from about 1.0 psi to about 25 psi, or from about 1.0 psi to about 15 psi. The SPM feed stream 112 and the acid gas feed stream 114 may each independently exhibit a substantially constant (e.g., substantially invariable, substantially unchanging, etc.) pressure over the period of time the SPM feed stream 112 and the acid gas feed stream 114 are directed into the gas diffusion membrane apparatus 102, or one or more of the SPM feed stream 112 and the acid gas feed stream 114 may exhibit variable (e.g., non-constant, changing, etc.) pressures over the period of time the SPM feed stream 112 and the acid gas feed stream 114 are directed into the gas diffusion membrane apparatus 102. In some embodiments, the pressure of one or more of the SPM feed stream 112 and the acid gas feed stream 114 is changed (e.g., increased) over the period of time the SPM feed stream 112 and the acid gas feed stream 114 are directed into the gas diffusion membrane apparatus 102 to account for viscosity changes (e.g., increases in the viscosity of the SPM feed stream 112) within the gas diffusion membrane apparatus 102 during the production of the SPM product stream 116.

The flow rate(s) of the SPM feed stream 112 and the acid gas feed stream 114 may independently be selected relative to one another, the material compositions of the SPM feed stream 112 and the acid gas feed stream 114, and the configuration of the gas diffusion membrane apparatus 102 to control residence time within the gas diffusion membrane apparatus 102 as well as the concentration of the polar form of the SPM in the SPM product stream 116 exiting the gas diffusion membrane apparatus 102. By way of non-limiting example, the SPM feed stream 112 and the acid gas feed stream 114 may each independently exhibit a flow rate within a range of from about 100 milliliters per minute (ml/min) per one (1) square meter ($m^2$) of modularized membrane to about 10000 milliliters/min per one (1) $m^2$ of modularized membrane, such as from about 200 ml/min per one (1) $m^2$ of modularized membrane to about 5000 ml/min per one (1) $m^2$ of modularized membrane, from about 300 ml/min per one (1) $m^2$ of modularized membrane to about 1000 ml/min per one (1) $m^2$ of modularized membrane, or from about 500 ml/min per one (1) $m^2$ of modularized membrane to about 1000 ml/min per one (1) $m^2$ of modularized membrane. The SPM feed stream 112 and the acid gas feed stream 114 may each independently exhibit a substantially constant (e.g., substantially invariable, substantially unchanging, etc.) flow rate over the period of time the SPM feed stream 112 and the acid gas feed stream 114 are directed into the gas diffusion membrane apparatus 102, or one or more of the SPM feed stream 112 and the acid gas feed stream 114 may exhibit variable (e.g., non-constant, changing, etc.) flow rates over the period of time the SPM feed stream 112 and the acid gas feed stream 114 are directed into the gas diffusion membrane apparatus 102. In some embodiments, the flow rate of at least the SPM feed stream 112 is substantially constant of the period of time the SPM feed stream 112 and the acid gas feed stream 114 are directed into the gas diffusion membrane apparatus 102.

With continued reference to FIG. 1, the gas diffusion membrane apparatus 102 may comprise at least one device or apparatus configured and operated to form the SPM product stream 116 from components of the SPM feed stream 112 and the acid gas feed stream 114. Molecules of acid gas (e.g., $CO_2$) from acid gas feed stream 114 may diffuse through the gas diffusion membrane 108 and into the SPM feed stream 112 to react with at least the non-polar form of the SPM and the solvent of the SPM feed stream 112 and form the SPM product stream 116 including the polar form of the SPM, as described in further detail below.

In embodiments wherein the SPM feed stream 112 directed into the gas diffusion membrane apparatus 102 includes at least one amine compound (e.g., at least one tertiary amine compound), molecules of acid gas from the acid gas feed stream 114 diffused through the gas diffusion membrane 108 and into the SPM feed stream 112 may convert the amine compound into an aminium salt. As used herein, the term "aminium salt" means and includes an aminium cation and an anionic counterion and has a neutral charge. By way of non-limiting example, if the acid gas feed stream 114 includes $CO_2$ and the SPM feed stream 112 includes at least one amine compound and one or more of $H_2O$, an alcohol, and a material having at least one hydroxyl functional group, molecules of $CO_2$ from the acid gas feed stream 114 may diffuse across the gas diffusion membrane 108 and convert the amine compound into one or more of an aminium bicarbonate (e.g., if the SPM feed stream 112 includes $H_2O$) and an aminium alkyl carbonate (e.g., if the SPM feed stream 112 includes one or more of an alcohol and a material having at least one hydroxyl functional group) according to one or more of the following reversible reactions:

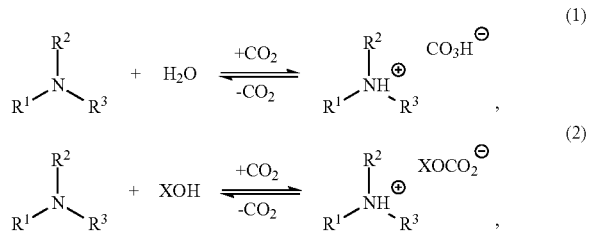

where $R^1$, $R^2$, and $R^3$ are as defined above; and where X is a substituted or unsubstituted alkyl, alkenyl, alkynyl, aryl, silyl, or siloxyl, is linear, branched, or cyclic, and/or comprises one or more of a liquid, a gel, a solute, a heterogeneous material, a suspended solid, and a separated solid.

In embodiments wherein the SPM feed stream 112 includes at least one amidine compound, molecules of acid gas from the acid gas feed stream 114 diffused through the acid gas diffusion membrane 108 and into the SPM feed stream 112 may convert the amidine compound into an amidinium salt. As used herein, the term "amidinium salt" means and includes an amidinium cation and an anionic counterion and has a neutral charge. As a non-limiting example, if the acid gas feed stream 114 includes $CO_2$ and the SPM feed stream 112 includes at least one amidine compound and one or more of $H_2O$, an alcohol, and a material having at least one hydroxyl functional group, molecules of $CO_2$ from the acid gas feed stream 114 may diffuse across the gas diffusion membrane 108 and convert the amidine compound into one or more of an amidinium bicarbonate (e.g., if the SPM feed stream 112 includes $H_2O$) and an amidinium alkyl carbonate (e.g., if the SPM feed stream 112 includes one or more of an alcohol and a material having at least one hydroxyl functional group) according to one or more of the following reversible reactions:

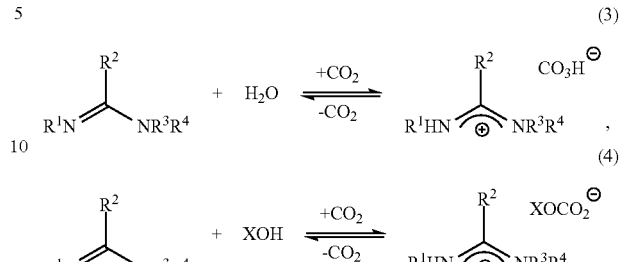

where $R^1$, $R^2$, $R^3$, $R^4$, and X are as defined above.

In embodiments wherein the SPM feed stream 112 includes at least one guanidine compound, molecules of acid gas from the acid gas feed stream 114 diffused through the acid gas diffusion membrane 108 and into the SPM feed stream 112 may convert the guanidine compound into a guanidinium salt. As used herein, the term "guanidinium salt" means and includes a guanidinium cation and an anionic counterion and has a neutral charge. As a non-limiting example, if the acid gas feed stream 114 includes $CO_2$ and the SPM feed stream 112 includes at least one guanidine compound and one or more of water, an alcohol, and a material having at least one hydroxyl functional group, molecules of $CO_2$ from the acid gas feed stream 114 may diffuse across the gas diffusion membrane 108 and convert the guanidine compound into one or more of a guanidinium bicarbonate (e.g., if the SPM feed stream 112 includes water) and a guanidinium alkyl carbonate (e.g., if the SPM feed stream 112 includes one or more of an alcohol and a material having at least one hydroxyl functional group) according to one or more of the following reversible reactions:

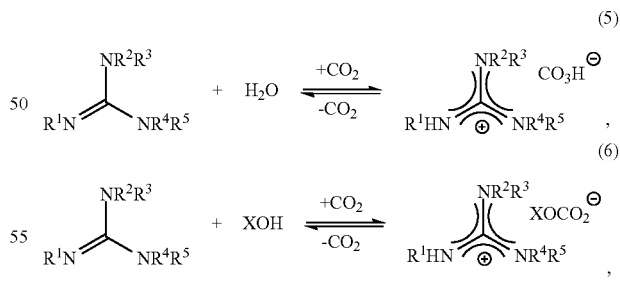

where $R^1$, $R^2$, $R^3$, $R^4$, $R^5$, and X are as defined above.

In some embodiments, the acid gas feed stream 114 includes $CO_2$ and the SPM feed stream 112 includes 1-cyclohexylpiperidine and water, and molecules of $CO_2$ diffuse across the gas diffusion membrane 108 and into the SPM feed stream 112 to convert at least a portion of the 1-cyclohexylpiperidine into 1-cyclohexylpiperidinium bicarbonate according to the following reversible reaction:

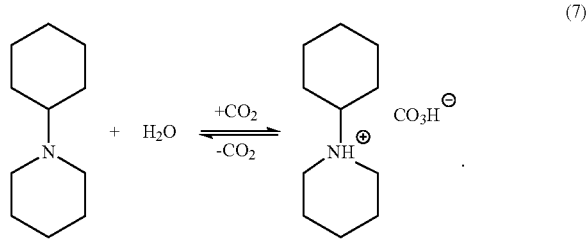

(7)

In embodiments wherein the SPM feed stream 112 includes at least one additive in addition to the non-polar form of the SPM and the solvent, the diffusion of the acid gas (e.g., $CO_2$) of the acid gas feed stream 114 through the gas diffusion membrane 108 and into the SPM feed stream 112 may form an SPM product stream 116 including multiple phases. For example, a first phase of the SPM product stream 116 may include the polar form of the SPM as well as a remainder of the solvent (e.g., water, alcohol, a material having at least one hydroxyl functional group, etc.) of the SPM feed stream 112, and a second phase of the SPM product stream 116 may include the additive. In such embodiments, the separate phases of the SPM product stream 116 may subsequently be separated from one another (e.g., by way of one or more mechanical separation processes, such as decanting, filtering, and/or centrifuging) and individually utilized or disposed of as desired.

Still referring to FIG. 1, the housing structure 122 of the gas diffusion membrane apparatus 102 may exhibit any desired shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the gas diffusion membrane 108 therein, to receive the SPM feed stream 112 and the acid gas feed stream 114, and to direct the SPM feed stream 112 and the acid gas feed stream 114 to opposing sides of the gas diffusion membrane 108. In some embodiments, the housing structure 122 exhibits an elongate tubular shape. The housing structure 122 may at least partially define at least one internal chamber 124 at least partially surrounding the gas diffusion membrane 108. The gas diffusion membrane 108 may serve as a boundary between at least one first region 126 of the internal chamber 124 configured and positioned to receive the SPM feed stream 112, and at least one second region 128 of the internal chamber 124 configured and positioned to receive the acid gas feed stream 114. As shown in FIG. 1, the housing structure 122 may include at least one SPM feed stream inlet 130 and at least one SPM product stream outlet 132 in fluid communication with the first region 126 of the internal chamber 124, and at least one acid gas stream inlet 134 and at least one acid gas stream outlet 136 in fluid communication with the second region 128 of the internal chamber 124. The SPM feed stream inlet 130 may be configured and positioned to receive and direct the SPM feed stream 112 into the first region 126 of the internal chamber 124, and the SPM product stream outlet 132 may be configured and positioned to receive and direct the SPM product stream 116 from the first region 126 of the internal chamber 124. The acid gas stream inlet 134 may be configured and positioned to receive and direct the acid gas feed stream 114 into the second region 128 of the internal chamber 124, and the acid gas stream outlet 136 may be configured and positioned to receive and direct an acid gas effluent stream 120 from the second region 128 of the internal chamber 124.

The housing structure 122 may be formed of and include at least one material that is compatible with the components of the SPM feed stream 112, the acid gas feed stream 114, and the SPM product stream 116, and that is resistant to one or more of physical degradation (e.g., abrasion, erosion, etc.) and chemical degradation (e.g., corrosion). By way of non-limiting example, the housing structure 122 may be formed of and include one or more of a polymer (e.g., a polyolefin, such as a polyethylene, a polypropylene, etc.), a metal, a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), a ceramic (e.g., metal carbides, metal nitrides, metal oxides, metal borides, etc.), and a ceramic-metal composite material. In some embodiments, the housing structure 122 is formed of and includes a polyethylene. In additional embodiments, housing structure 122 is formed of and includes a stainless steel.

The gas diffusion membrane 108 may be coupled to or integral with the housing structure 122. Optionally, at least one additional structure may be configured and positioned to support (e.g., maintain the position of) the gas diffusion membrane 108 within the housing structure 122. The gas diffusion membrane 108 is configured and positioned to facilitate the controlled migration (e.g., diffusion) of molecules of acid gas (e.g., molecules of $CO_2$) from the acid gas feed stream 114 into the SPM feed stream 112 to form the SPM product stream 116 including the polar form of the SPM. The extent to which the acid gas diffuses through the gas diffusion membrane 108 and interacts with the components (e.g., the non-polar form of the SPM, the solvent, etc.) of the SPM feed stream 112 to form the SPM product stream 116 at least partially depends on the properties (e.g., material compositions, temperatures, pressures, flow rates, etc.) of the SPM feed stream 112 and the acid gas feed stream 114, and on the properties (e.g., size, shape, porosity, material composition, material distribution, position, quantity, etc.) of the gas diffusion membrane 108. The properties of the gas diffusion membrane 108 may be selected relative to one another and at least partially based on the properties of the SPM feed stream 112 and the acid gas feed stream 114 to facilitate the formation of an SPM product stream 116 including a desired concentration of the polar form of the SPM in a desired period of time. In some embodiments, at least the size, shape, porosity, material composition, material distribution, position, and quantity of the gas diffusion membrane(s) 108 are selected to facilitate the formation of an SPM product stream 116 including greater than or equal to about 4.0 mol/kg of the polar form of the SPM in less than or equal to about 4 hours (e.g., less than or equal to about 3 hours, less than or equal to about 2 hours, less than or equal to about 1 hour, etc.).

The gas diffusion membrane 108 may exhibit any size and any shape facilitating the migration of a desired amount of acid gas (e.g., $CO_2$) from the acid gas feed stream 114 into the SPM feed stream 112. The size and the shape of the gas diffusion membrane 108 may be selected relative a size and a shape of the housing structure 122 such that the gas diffusion membrane 108 is substantially contained within boundaries of the gas diffusion membrane 108, and such that the gas diffusion membrane 108 at least partially (e.g., substantially, completely, etc.) intervenes between different regions (e.g., the first region 126 and the second region 128) of the internal chamber 124 of the gas diffusion membrane apparatus 102. By way of non-limiting example, the gas diffusion membrane 108 at least partially (e.g., substantially) extends (e.g., laterally extends, longitudinally extends, etc.) between opposing surfaces (e.g., lateral surfaces, longitudinal surfaces) of the housing structure 122, and may exhibit one or more of a cubic shape, cuboidal shape, a tubular shape, a tubular spiral shape, a spherical shape, a semispherical shape, a cylindrical shape, a semi-cylindrical shape, a conical shape, a triangular prismatic shape, a truncated version of one or more of the foregoing, and an irregular shape. As shown in FIG. 1, in some embodiments, the gas diffusion membrane 108 exhibits a substantially cuboidal shape (e.g., a plate shape) extending from a first end of the housing structure 122 to a second, opposing end of the housing structure 122. In such embodiments, the first region 126 of the internal chamber 124 of the gas diffusion membrane apparatus 102 may be positioned adjacent a first external surface of the gas diffusion membrane 108, and the second region 128 of the internal chamber 124 of the gas diffusion membrane apparatus 102 may be positioned adjacent a second, opposing external surface of the gas diffusion membrane 108, or vice versa. In additional embodiments, the gas diffusion membrane 108 exhibits a different shape, such as a tubular shape (e.g., a linear tubular shape; a non-linear tubular shape, such as an angled tubular shape, a curved tubular shape, a spiraled tubular shape; etc.). In such embodiments, the first region 126 of the internal chamber 124 of the gas diffusion membrane apparatus 102 may be positioned adjacent an external surface of the gas diffusion membrane 108, and the second region 128 of the internal chamber 124 of the gas diffusion membrane apparatus 102 may be positioned adjacent an internal surface of the gas diffusion membrane 108, or vice versa.

The gas diffusion membrane 108 may exhibit a porosity that, in combination with the properties (e.g., temperatures, pressures, flow rates, etc.) of the SPM feed stream 112 and the acid gas feed stream 114, facilitates the introduction of acid gas (e.g., $CO_2$) from the acid gas feed stream 114 into the SPM feed stream 112 at a rate permitting the acid gas to substantially remain in solution with the solvent of the SPM feed stream 112. The gas diffusion membrane 108 may exhibit a porosity that substantially limits (e.g., prevents) the formation of bubbles of the acid gas (e.g., portions of the acid gas driven out of solution with the solvent) in the SPM feed stream 112 under the temperatures, pressures, and flow rates of the acid gas feed stream 114 into the SPM feed stream 112. The porosity of the gas diffusion membrane 108 may, for example, facilitate a permeation flux of acid gas (e.g., $CO_2$) less than or equal to about 1000 g/(m² hr), less than or equal to about 500 g/(m² hr), or about 200 g/(m² hr). Pores (e.g., apertures, openings, etc.) of the gas diffusion membrane 108 may extend in tortuous (e.g., twisting, winding, etc.) paths throughout a thickness of the gas diffusion membrane 108, or may extend in substantially linear paths throughout a thickness of the gas diffusion membrane 108. In some embodiments, the pores of the gas diffusion membrane 108 extend in tortuous paths through the gas diffusion membrane 108. Each of the pores of the gas diffusion membrane 108 may independently exhibit an average pore diameter of less than or equal to about 500 nanometers (nm), such as less than or equal to about 250 nm, or less than or equal to about 100 nm. The porosity of the gas diffusion membrane 108 may permit the migration of acid gas (e.g., $CO_2$) from the from acid gas feed stream 114 into the SPM feed stream 112, but may impede (e.g., prevent) the migration of one or more components of the SPM feed stream 112 and the SPM product stream 116 (e.g., the non-polar form of the SPM, the polar form of the SPM, the solvent, the additives, etc.) into the acid gas feed stream 114. In some embodiments, the porosity of the gas diffusion membrane 108 only permits the diffusion of $CO_2$ molecules from the acid gas feed stream 114 through the gas diffusion membrane 108.

The gas diffusion membrane 108 may be formed of and include at least one material that is compatible with the components of the SPM feed stream 112, the acid gas feed stream 114, and the SPM product stream 116, and that facilitates the diffusion of acid gas (e.g., $CO_2$) molecules therethrough. By way of non-limiting example, the gas diffusion membrane 108 may be formed of and include a polymer a polyolefin, such as a polyethylene, a polypropylene, etc.; a polyphosphazene; a polysulfone; a fluorinated polymer, such as poly(terafluoroethylene) (PUT), poly(vinylidene fluoride), etc.; a poly(ether ketone); a poly(ether ether ketone); a poly(ether sulfone); a polydimethylsiloxane; a silicone polymer; a cellulose acetate; etc.), a polymeric composite material, a metal, a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), a ceramic (e.g., metal carbides, metal nitrides, metal oxides, metal borides, etc.), silicone oxide material, coasted silicone oxide material, and a ceramic-metal composite material. The material of the gas diffusion membrane 108 may be substantially hydrophobic and may be formulated to prevent the release of contaminants into the each of the SPM feed stream 112, the acid gas feed stream 114, and the SPM product stream 116. As used herein, the term "hydrophobic" means and includes any material or surface with which water droplets have a contact angle in air of at least 90°, as measured by a contact angle goniometer as described in ASTM Standard D7334-08 (*Standard Practice for Surface Wettability of Coatings, Substrates and Pigments by Advancing Contact Angle Measurement*, ASTM Intl, West Conshohocken, Pa., 2008), which standard is incorporated herein in its entirety by this reference. In some embodiments the gas diffusion membrane 108 is formed of and includes a polypropylene. In additional embodiments the gas diffusion membrane 108 is formed of and includes a stainless steel.

The gas diffusion membrane 108 may be substantially homogeneous or may be substantially heterogeneous. As used herein, the term "homogeneous" means amounts of a material do not vary throughout different portions (e.g., different lateral and longitudinal portions) of a structure. Conversely, as used herein, the term "heterogeneous" means amounts of a material vary throughout different portions of a structure. Amounts of the material may vary stepwise (e.g., change abruptly), or may vary continuously (e.g., change progressively, such as linearly, parabolically) throughout different portions of the structure. In some embodiments, the gas diffusion membrane 108 is substantially homogeneous. In additional embodiments, the gas diffusion membrane 108 is heterogeneous. The gas diffusion membrane 108 may, for example, be formed of and include a stack of at least two different materials.

The gas diffusion membrane 108 may exhibit any desired position and any desired orientation within the housing structure 122. By way of non-limiting example, as shown in FIG. 1, the gas diffusion membrane 108 may be positioned centrally about and extend parallel to a lateral axis 140 of the housing structure 122. In additional embodiments, the gas diffusion membrane 108 may exhibit one or more of a different position and a different orientation within the housing structure 122. By way of non-limiting example, the gas diffusion membrane 108 may be positioned more distal from (e.g., offset from) the lateral axis 140 of housing structure 122, and/or may extend non-parallel (e.g., perpendicular to, diagonal to, etc.) to the lateral axis 140 of the housing structure 122.

The gas diffusion membrane apparatus 102 may include any desired quantity (e.g., number) of gas diffusion membranes 108. As shown in FIG. 1, in some embodiments, the gas diffusion membrane apparatus 102 includes a single (e.g., only one) gas diffusion membrane 108. In additional embodiments, the gas diffusion membrane apparatus 102 includes multiple (e.g., more than one) gas diffusion membranes 108. If the gas diffusion membrane apparatus 102 includes multiple gas diffusion membranes 108, each of the gas diffusion membranes 108 may be substantially the same (e.g., exhibit substantially the same size, the same shape, the same material composition, and the same material distribution) as one another, or at least one of the gas diffusion membranes 108 may be different (e.g., exhibit one or more of a different size, a different shape, different material composition, and a different material distribution) than at least one other of the gas diffusion membranes 108. In addition, if the gas diffusion membrane apparatus 102 includes multiple gas diffusion membranes 108, adjacent gas diffusion membranes 108 may be substantially uniformly (e.g., evenly) spaced apart from one another, or may be non-uniformly (non-evenly) spaced apart from one another.

One or more of the housing structure 122 and the gas diffusion membrane(s) 108 may, optionally, include at least one catalyst material thereon, thereover, and/or therein. As used herein, the terms "catalyst material" and "catalyst" each mean and include a material formulated to promote one or more reactions, resulting in the formation of a product. The catalyst material may accelerate reaction rates within the gas diffusion membrane apparatus 102 (e.g., within the first region 126 of the internal chamber 124) between acid gas (e.g., $CO_2$) of the acid gas feed stream 114 and components (e.g., the non-polar form of the SPM, the solvent, etc.) of the SPM feed stream 112. As a non-limiting example, the catalyst material may comprise carbonic anhydrase. The catalyst material may, for example, be bound (e.g., coupled) to one or more portions (e.g., one or more portions of one or more surfaces) of one or more of the housing structure 122 and the gas diffusion membrane(s) 108. In some embodiments, the catalyst material is at least partially coated on or over one or more surfaces (e.g., at least one external surface of the gas diffusion membrane(s) 108, at least one internal surface of the gas diffusion membrane(s) 108, at least one internal surface of the housing structure 122, etc.) of the gas diffusion membrane apparatus 102 at least partially defining a region (e.g., the first region 126) of the internal chamber 124 configured and positioned to receive the SPM feed stream 112 and to produce the SPM product stream 116. In additional embodiments, the catalyst material may be included in one or more structures and/or apparatuses (e.g., pipes, mixers, storage vessels, etc.) upstream and/or downstream of the gas diffusion membrane apparatus 102. In further embodiments, the catalyst material may be included as a component (e.g., additive) of the SPM feed stream 112.

Figure 2:
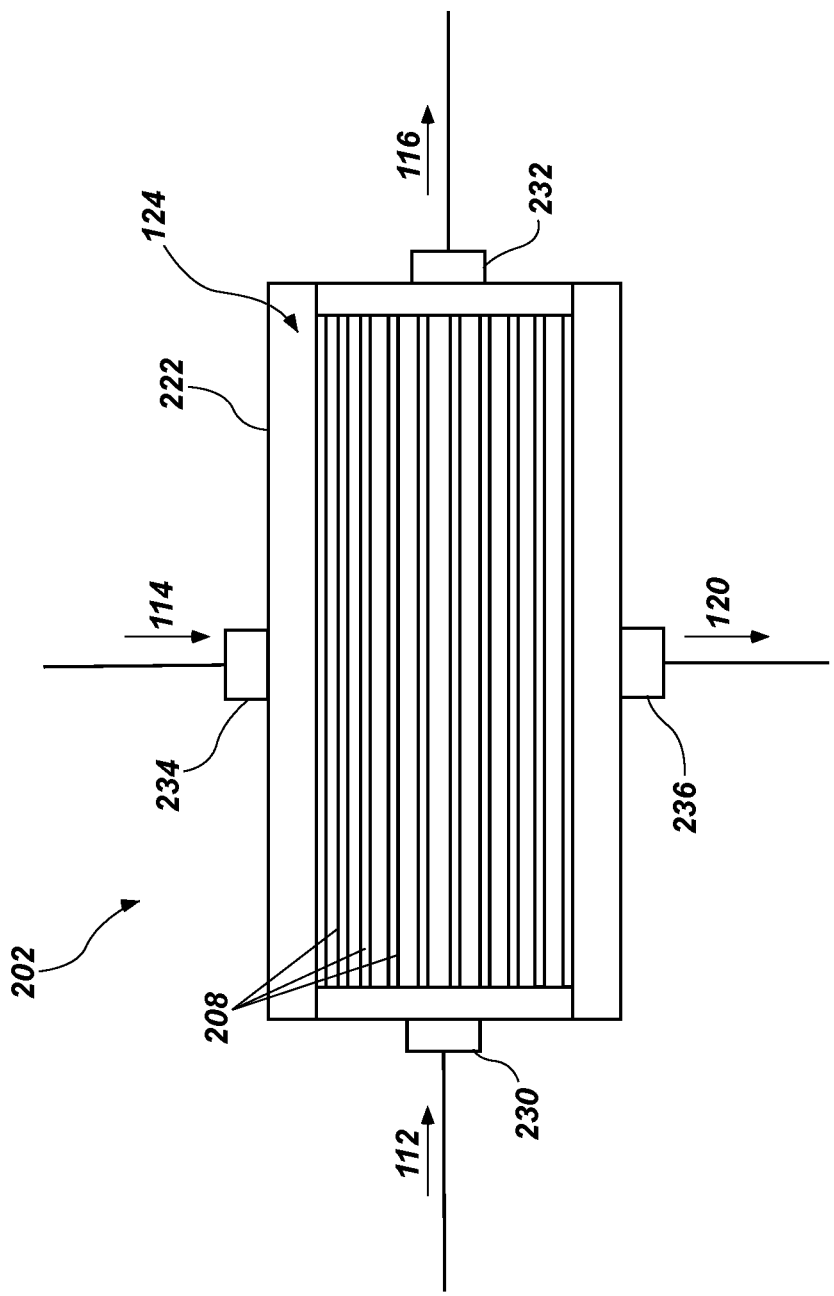
FIG. 2 is a simplified transverse cross-sectional view of a gas diffusion membrane apparatus for treating an SPM, in accordance with an embodiment of the disclosure.

While FIG. 1 depicts a particular configuration of the gas diffusion membrane apparatus 102, the gas diffusion membrane apparatus 102 may exhibit a different configuration, such as a configuration exhibiting one or more of a different size, a different shape, different features, different feature spacing, different components, and a different arrangement of components. FIG. 1 illustrates just one non-limiting example of the gas diffusion membrane apparatus 102. The gas diffusion membrane apparatus 102 may, for example, include a different configuration of one or more of the gas diffusion membrane 108 and the housing structure 122, and/or a different arrangement of the gas diffusion membrane 108 and the housing structure 122. By way of non-limiting example, in additional embodiments, the gas diffusion membrane apparatus 102 may exhibit the configuration illustrated in FIG. 2. To avoid repetition, not all features shown in FIG. 2 are described in detail herein. Rather, unless described otherwise below, features designated by a reference numeral that is a 100 increment of the reference numeral of a feature described previously in relation to FIG. 1 will be understood to be substantially similar to the feature described previously.

FIG. 2 depicts a gas diffusion membrane apparatus 202 that may be included in the treatment system 100 (FIG. 1). The gas diffusion membrane apparatus 202 may be included in the treatment system 100 in place of or in combination with the gas diffusion membrane apparatus 102 previously described in relation to FIG. 1. As shown in FIG. 2, the gas diffusion membrane apparatus 202 may include a housing structure 222 and tubular membranes 208 (e.g., hollow fiber membranes; linear tubular membranes; non-linear tubular membranes, such as angled tubular membranes, curved tubular membranes, spiraled tubular membranes; etc.) contained within the housing structure 222. The diffusion membrane apparatus 202 may be configured to receive the SPM feed stream 112 and the acid gas feed stream 114, and to produce the SPM product stream 116 from the components thereof (e.g., the acid gas of the acid gas feed stream 114, and the solvent and the non-polar form of the SPM of the SPM feed stream 112). The housing structure 222 and the tubular membranes 208 may have configurations (e.g., sizes, shapes, material compositions, material distributions, positions, orientations, etc.) facilitating the formation of the SPM product stream 116 through the controlled diffusion of molecules of acid gas (e.g., $CO_2$) from the acid gas feed stream 114, through the tubular membranes 208, and into the SPM feed stream 112. The configurations of the housing structure 222 and the tubular membranes 208 may be selected relative to one another, and in accordance with the considerations previously described with respect to configurations of the housing structure 122 and the gas diffusion membrane 108.

As shown in FIG. 2, in some embodiments, the SPM feed stream 112 is directed (e.g., flowed) through at least one SPM feed stream inlet 230 in the housing structure 222 and into interiors (e.g., hollow interiors) of the tubular membranes 208 while the acid gas feed stream 114 is directed through at least one acid feed stream inlet 234 in the housing structure 222 and around exteriors of the tubular membranes 208. The acid gas (e.g., $CO_2$) of the acid gas feed stream 114 may inwardly diffuse through the tubular membranes 208 and into the interiors thereof to interact with (e.g., react with) the components (e.g., the non-polar form of the SPM, the solvent, etc.) of the SPM feed stream 112 therein to form the SPM product stream 116 including the polar form of the SPM. The SPM product stream 116 may then be directed out of the interiors of the tubular membranes 208 and at least one SPM product stream outlet 232, and may be utilized or disposed of as desired. In addition, an acid gas effluent stream 120 including remaining (e.g., undiffused) acid gas (if any) may be directed out of at least one acid gas stream outlet 236, and may also be utilized or disposed of as desired. In additional embodiments, the acid gas feed stream 114 may be directed into the interiors of the tubular membranes 208 while the SPM feed stream 112 is directed around the exteriors of the tubular membranes 208, such that the acid gas of the acid gas feed stream 114 outwardly diffuses through the tubular membranes 208 to interact with the components of the SPM feed stream 112 surrounding the exteriors of the tubular membranes 208 and form the SPM product stream 116.

With returned reference to FIG. 1, although the treatment system 100 is depicted as including a single (i.e., only one) gas diffusion membrane apparatus 102 in FIG. 1, the treatment system 100 may include any number of gas diffusion membrane apparatuses 102. Put another way, the treatment system 100 may include a single (e.g., only one) gas diffusion membrane apparatus 102, or may include multiple (e.g., more than one) gas diffusion membrane apparatuses 102. If the treatment system 100 includes multiple gas diffusion membrane apparatuses 102, each of the gas diffusion membrane apparatuses 102 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, target residence times, etc.), or at least one of the gas diffusion membrane apparatus 102 may be different (e.g., exhibit one or more of different components, different component sizes, different component shapes, different component material compositions, different component material distributions, different component positions, different component orientations, etc.) than at least one other of the gas diffusion membrane apparatuses 102 and/or may be operated under different conditions (e.g., different temperatures, different pressures, different flow rates, different target residence times, etc.) than at least one other of the gas diffusion membrane apparatuses 102. By way of non-limiting example, one of the diffusion membrane apparatuses 102 may be configured and operated under one or more of a different temperature (e.g., resulting from at least one different stream temperature, such as a different temperature of the SPM feed stream 112 and/or a different temperature of the acid feed stream 114), a different differential pressure across the gas diffusion membrane(s) 108 thereof (e.g., resulting from at least one different stream pressure, such as a different pressure of the SPM feed stream 112 and/or a different pressure of the acid feed stream 114), and a different target residence time (e.g., resulting from at least one different stream flow rate, such as a different flow rate of the SPM feed stream 112) than at least one other of the diffusion membrane apparatuses 102.

In embodiments wherein the treatment system 100 includes multiple gas diffusion membrane apparatuses 102, the multiple gas diffusion membrane apparatuses 102 may be provided in parallel to one another, in series with one another, or a combination thereof. If two or more gas diffusion membrane apparatuses 102 are provided in parallel with one another, each of the two or more gas diffusion membrane apparatuses 102 may independently receive an SPM feed stream 112 and an acid gas feed stream 114, and may produce an SPM product stream 116. If two or more gas diffusion membrane apparatuses 102 are provided in series with one another, a first gas diffusion membrane apparatus 102 may receive an SPM feed stream 112 and an acid gas feed stream 114 and may produce an SPM product stream 116, and a second gas diffusion membrane apparatus 102 downstream of the first gas diffusion membrane apparatus 102 may receive the SPM product stream 116 and an additional acid gas stream (e.g., another acid gas feed stream 114, the acid gas effluent stream 120 exiting the first gas diffusion membrane apparatus 102) and may produce an additional SPM product stream having a greater concentration of the polar form of the SPM than the SPM product stream 116.

Still referring to FIG. 1, the SPM product stream 116 exiting the gas diffusion membrane apparatus 102 may be utilized or disposed of as desired. In some embodiments, the SPM product stream 116 is directed to one or more additional apparatuses downstream of the gas diffusion membrane apparatus 102. As a non-limiting example, at least a portion of the SPM product stream 116 may be directed into a forward osmosis device and may be employed as a draw solution to draw (e.g., pull) a solvent across a semi-permeable membrane, in a process similar to that described in U.S. application Ser. No. 13/480,053, the disclosure of which was previously incorporated herein in its entirety. As another non-limiting example, in embodiments wherein the SPM product stream 116 includes an additive (e.g., an additive received from the SPM feed stream 112) in addition to the solvent and the polar form of the SPM, SPM product stream 116 may be directed into at least one apparatus (e.g., at least one mechanical separation apparatus, such as a decanter, a filter, and/or a centrifuge) configured and operated to separate the additive from the other components of the SPM product stream 116. As shown in FIG. 1, in some embodiments, at least a portion 118 of the SPM product stream 116 may be recycled into one or more of the SPM source 104 and the SPM feed stream 112. Recycling at least a portion 118 of the SPM product stream 116 may be used to increase the concentration of the polar form of the SPM in an additional volume of the SPM product stream 116 subsequently exiting the gas diffusion membrane apparatus 102.

The acid gas effluent stream 120, if any, exiting the gas diffusion membrane apparatus 102 may also be utilized or disposed of as desired. In some embodiments, the properties (e.g., material composition, temperature, pressure, flow rate, etc.) of the acid gas feed stream 114 are selected and controlled relative to one another and the properties of the SPM feed stream 112 and the gas diffusion membrane apparatus 102 so that no acid gas effluent stream 120 exits the gas diffusion membrane apparatus 102. For example, the properties of the acid gas feed stream 114 may be selected and controlled such that substantially all of the components (e.g., acid gas, such as $CO_2$) of the acid gas feed stream 114 delivered into the gas diffusion membrane apparatus 102 are reacted (e.g., with one or more components of the SPM feed stream 112) or consumed. In additional embodiments where the acid gas effluent stream 120 does exit the gas diffusion membrane apparatus 102, the acid gas effluent stream 120 may be utilized to produce an additional amount of the polar form of the SPM. As a non-limiting example, the acid gas effluent stream 120 may be recycled, in total or in part, into at least one of the acid gas source 106 and the acid gas feed stream 114. As another non-limiting example, the acid gas effluent stream 120 may be directed, in total or in part, into another gas diffusion membrane apparatus receiving the SPM product stream 116 from the gas diffusion membrane apparatus 102 to diffuse additional acid gas through at least one additional gas diffusion membrane and into the SPM product stream 116 to convert at least a portion of any non-polar form of the SPM present in the SPM product stream 116 into the polar form of the SPM.

The methods and systems of the disclosure facilitate the simple and efficient conversion of a non-polar form (e.g., an amine compound, an amidine compound, a guanidine compound) of an SPM into a polar form (e.g., an aminium salt, an amidinium salt, a guanidinium salt) of an SPM. The methods and systems of the disclosure may reduce one or more of the time, materials, and energy required to generate a product (e.g., product solution) including a desired concentration of the polar form of the SPM as compared to conventional methods and conventional systems. The methods and systems of the disclosure may facilitate the use of SPMs in a variety of industrial applications (e.g., industrial forward osmosis applications, industrial material purification applications, industrial material separation applications, etc.) that may otherwise be unfeasible due to the limitations (e.g., relatively longer time requirements; relatively larger material, equipment, and/or energy needs; etc.) of conventional methods and conventional systems for treating SPMs.

The following examples serve to explain embodiments of the disclosure in more detail. These examples are not to be construed as being exhaustive or exclusive as to the scope of the disclosure.

EXAMPLES

Example 1

Figure 3:
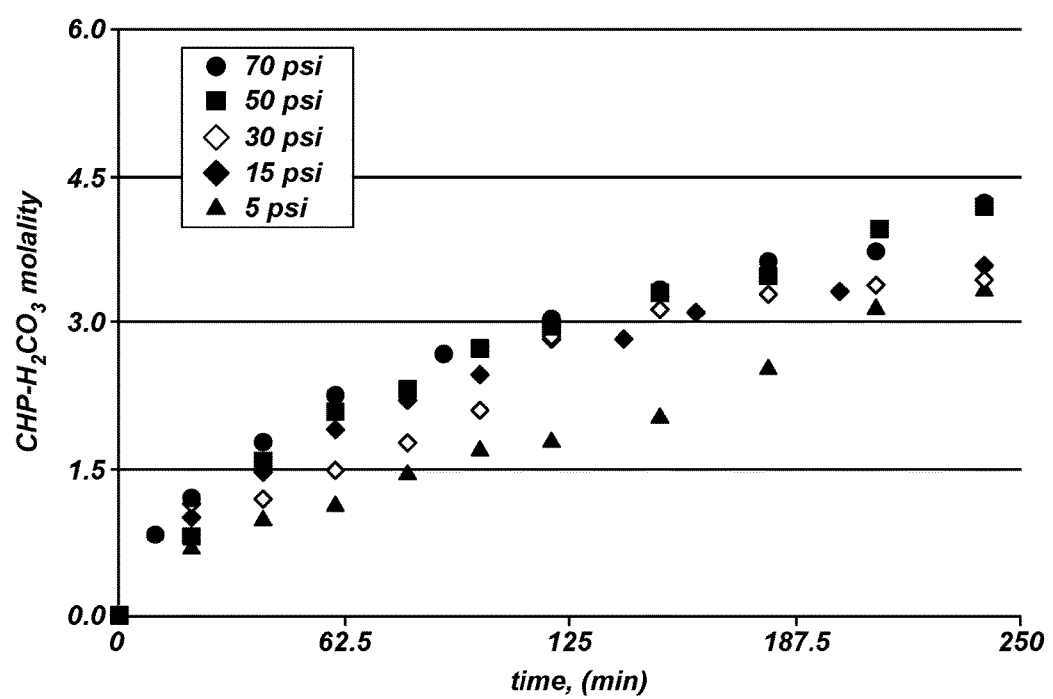
FIGS. 3 through 7 are graphical representations of the results described in Examples 1 through 5, respectively.

The effects of acid gas feed stream pressure on the production of the polar form of an SPM from an SPM feed stream including the non-polar form of the SPM using a gas diffusion membrane apparatus were analyzed. Different aqueous 1-cyclohexylpiperidinium bicarbonate (CHP—$H_2CO_3$) solutions were produced by independently introducing gaseous $CO_2$ and substantially similar mixtures of 1-cyclohexylpiperidine (CHP) and deionized $H_2O$ into a SUPERPHOBIC MICROMODULE® G680 gas diffusion membrane apparatus, commercially available from 3M company (Maplewood, Minn.), including polyolefin hollow fiber membranes having a total surface area of 1.0 m² contained within a polyethylene housing structure. The different CHP—$H_2CO_3$ solutions were produced using a substantially constant CHP/$H_2O$ mixture flow rate of about 800 ml/min, a substantially constant temperature of about 30° C., and gaseous trans-membrane $CO_2$ pressures of 5 psi, 15 psi, 20 psi, 30 psi, 50 psi, and 75 psi. For each CHP—$H_2CO_3$ solution produced, the gaseous $CO_2$ was directed through interiors of the polyolefin hollow fiber membranes, and the CHP/$H_2O$ mixture was directed around exteriors of the polyolefin hollow fiber membranes. FIG. 3 is a graph showing the results of the analysis. FIG. 3 shows that if the flow rate of a CHP/$H_2O$ mixture is kept constant throughout the $CO_2$ contacting process, the rate of CHP—$H_2CO_3$ generation is substantially similar for different gaseous trans-membrane $CO_2$ pressures within a range of from about 15 psi to about 70 psi. The modest reduction in rate at gaseous trans-membrane $CO_2$ pressure of 5 psi is believed to be associated with the mass transfer through the specific membrane and not a mass transfer limitation between the membrane surface and solution. The results indicate that mass transfer limitations associated with delivering $CO_2$ to the solution at the membrane surface are not rate limiting the production of CHP—$H_2CO_3$.

Example 2

Figure 4:
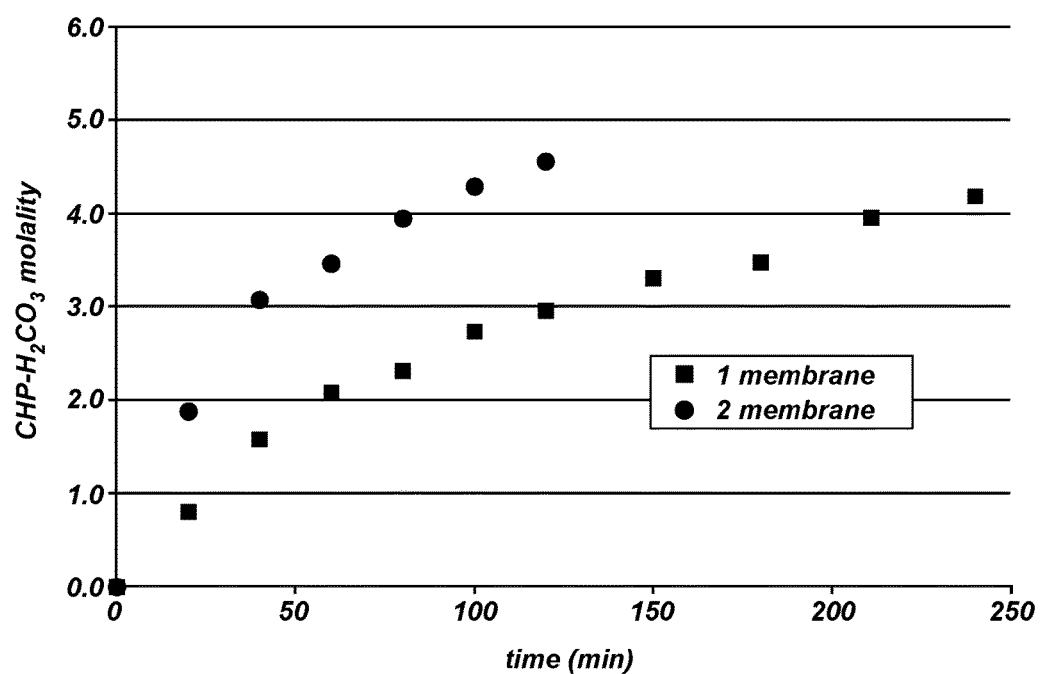

The effect of membrane surface area on the production of the polar form of an SPM from an SPM feed stream including the non-polar form of the SPM using a gas diffusion membrane apparatus was analyzed. Different aqueous 1-cyclohexylpiperidinium bicarbonate (CHP—$H_2CO_3$) solutions were produced by independently introducing gaseous $CO_2$ and substantially similar mixtures of 1-cyclohexylpiperidine (CHP) and deionized $H_2O$ into at least one SUPERPHOBIC MICROMODULE® G680 gas diffusion membrane apparatus (e.g., a single gas diffusion membrane apparatus, two gas diffusion membrane apparatuses in series with one another), commercially available from 3M company (Maplewood, Minn.), including polyolefin hollow fiber membranes having a total surface area of 1.0 m² contained within a polyethylene housing structure. The different CHP—$H_2CO_3$ solutions were produced using a substantially constant CHP/$H_2O$ mixture flow rate of about 800 ml/min, a substantially constant temperature of about 30° C., and gaseous trans-membrane $CO_2$ pressures of 50 psi. FIG. 4 is a graph showing the results of the analysis. The results indicate there are mass transfer limitations between a reactive liquid layer at the membrane surface within the module and the bulk solution. This determination is supported by the results of the experiments described in Example 3 in which the solution flow rate was varied.

Example 3

Figure 5:
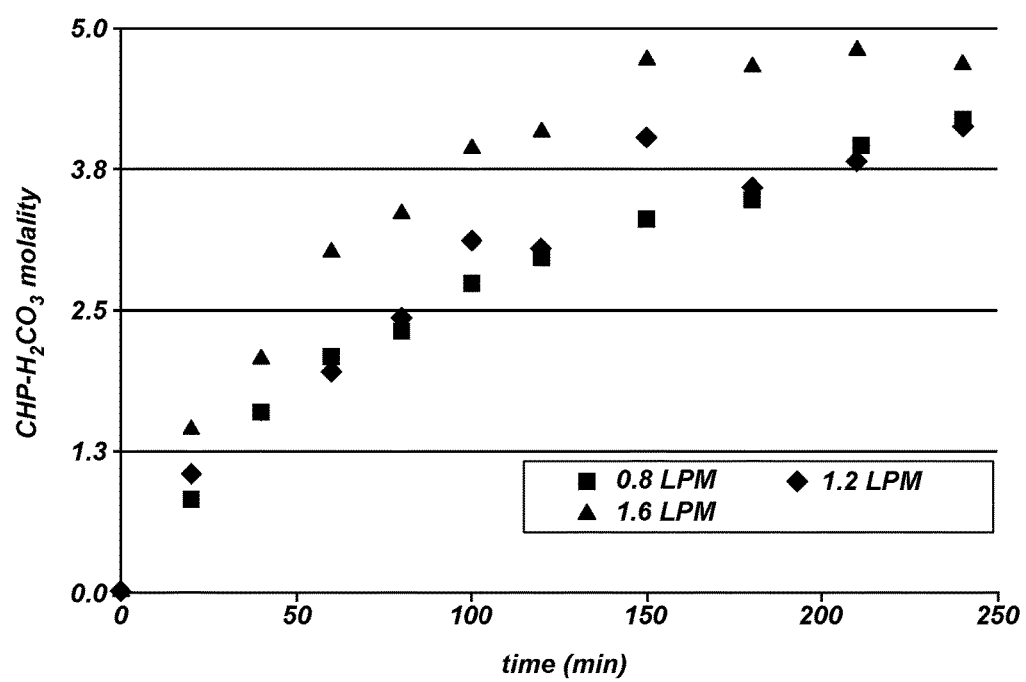

The effect of solution flow rate on the production of the polar form of an SPM from an SPM feed stream including the non-polar form of the SPM using a gas diffusion membrane apparatus was analyzed. Different aqueous 1-cyclohexylpiperidinium bicarbonate (CHP—$H_2CO_3$) solutions were produced by independently introducing gaseous $CO_2$ and substantially similar mixtures of 1-cyclohexylpiperidine (CHP) and deionized $H_2O$ into a SUPERPHOBIC MICROMODULE® G680 gas diffusion membrane apparatus, commercially available from 3M company (Maplewood, Minn.), including polyolefin hollow fiber membranes having a total surface area of 1.0 m² contained within a polyethylene housing structure. The different CHP—$H_2CO_3$ solutions were produced using a substantially constant CHP/$H_2O$ mixture flow rate of about 800 ml/min, 1,200 ml/min, and 1,600 ml/min a substantially constant temperature of about 30° C., and gaseous trans-membrane $CO_2$ pressures of 50 psi. FIG. 5 is a graph showing the results of the analysis. The results indicate that increased flow rate enhances mixing at the gas contactor surface and enhanced chemical reaction rate due to increased solution pressure resulting from increased resistance to liquid flow at higher rates.

Example 4

Figure 6:
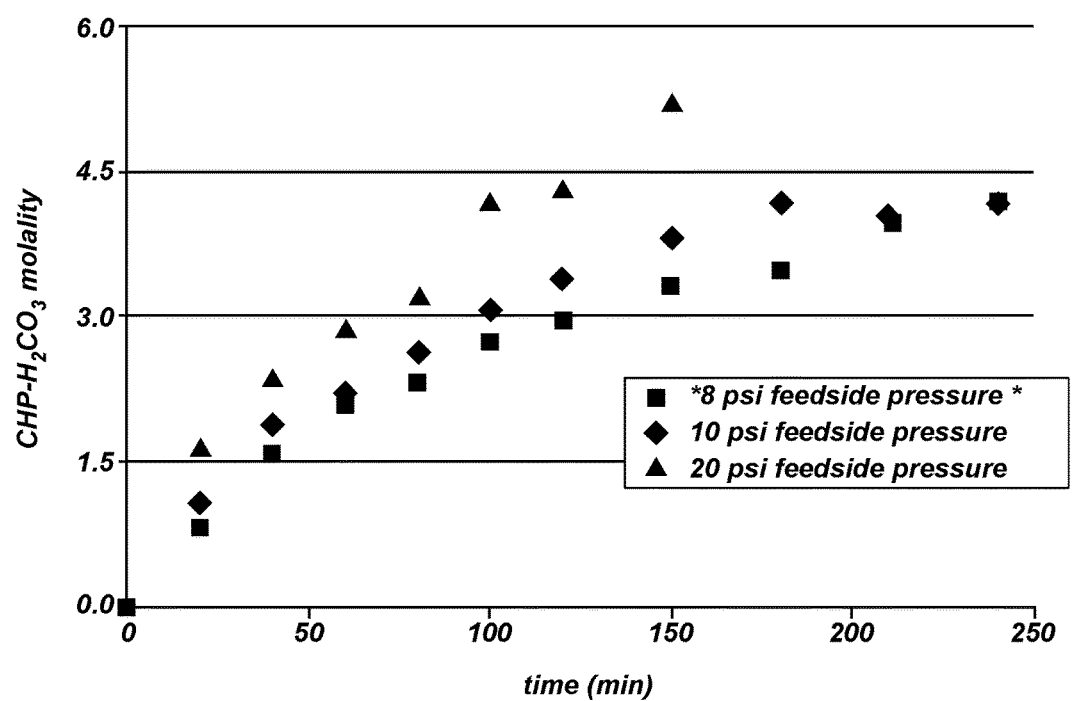

The effect of solution pressure on the production of the polar form of an SPM from an SPM feed stream including the non-polar form of the SPM using a gas diffusion membrane apparatus was analyzed. Different aqueous 1-cyclohexylpiperidinium bicarbonate (CHP—$H_2CO_3$) solutions were produced by independently introducing gaseous $CO_2$ and substantially similar mixtures of 1-cyclohexylpiperidine (CHP) and deionized $H_2O$ into a SUPERPHOBIC MICROMODULE® G680 gas diffusion membrane apparatus, commercially available from 3M company (Maplewood, Minn.), including polyolefin hollow fiber membranes having a total surface area of 1.0 m² contained within a polyethylene housing structure. The different CHP—$H_2CO_3$ solutions were produced using a substantially constant CHP/$H_2O$ mixture flow rate of about 800 ml/min, a substantially constant temperature of about 30° C., and gaseous trans-membrane $CO_2$ pressures of 50 psi, and solution pressures of 8 psi (for unrestricted flow), 10 psi (provided through controlled backpressure), and 20 psi (provided through controlled backpressure). FIG. 6 is a graph showing the results of the analysis. The results show that increasing solution pressure increases the concentration of $CO_2$ and the rate at which CHP—$H_2CO_3$ is produced, indicating chemical reaction dependence for CHP—$H_2CO_3$ production. The observation of chemical reaction dependency indicates that the gas diffusion membrane apparatus is very effective at addressing mass transfer challenges.

Example 5

Figure 7:
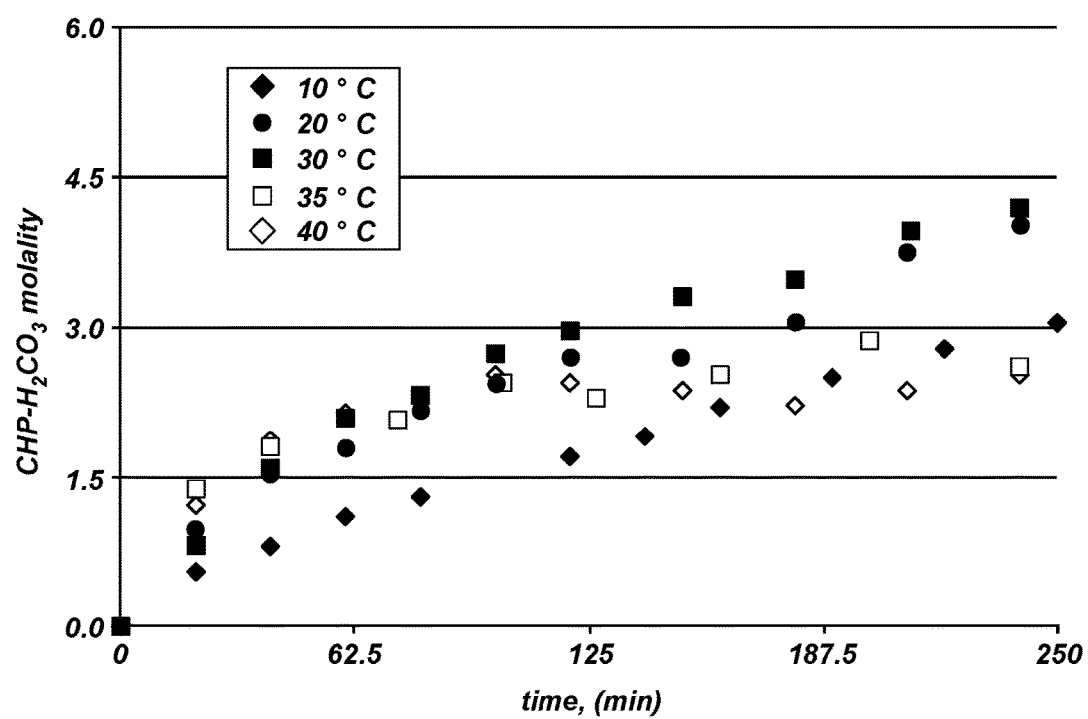

The effect of temperature on the production of the polar form of an SPM from an SPM feed stream including the non-polar form of the SPM using a gas diffusion membrane apparatus was analyzed. Different aqueous CHP—$H_2CO_3$ solutions were produced by independently introducing gaseous $CO_2$ and substantially similar CHP/$H_2O$ mixtures into a SUPERPHOBIC MICROMODULE® G680 gas diffusion membrane apparatus including polyolefin hollow fiber membranes having a total surface area of 1.0 $m^2$ contained within a polyethylene housing structure. The different CHP—$H_2CO_3$ solutions were produced using a substantially constant CHP/$H_2O$ mixture flow rate of about 800 ml/min, a substantially constant gaseous $CO_2$ pressure of 50 psi, and temperatures of 10° C., 20° C., 30° C., 35° C., and 40° C. For each CHP—$H_2CO_3$ solution produced, the gaseous $CO_2$ was directed through the interiors of the polyolefin hollow fiber membranes, and the CHP/$H_2O$ mixture was directed around exteriors of the polyolefin hollow fiber membranes. FIG. 7 is a graph showing the results of the analysis. As shown in FIG. 7, aqueous CHP—$H_2CO_3$ solutions produced at temperatures greater than or equal to about 35° C. exhibited a maximum CHP—$H_2CO_3$ concentration of about 2.5 mol/kg. The results indicate that at temperatures greater than or equal to about 35° C., the stability of the CHP—$H_2CO_3$ in the aqueous CHP—$H_2CO_3$ solutions begins to decline, effectuating the regeneration of CHP and $H_2O$. Without being bound to a particular theory, it is believed that at temperatures greater than or equal to about 35° C., intramolecular motion of the cation prevents intermolecular ion-ion and ion-solvent interactions that stabilize the polar form of the salt in solution. The aqueous CHP—$H_2CO_3$ solutions produced at temperatures less than or equal to about 30° C. did not appear exhibit the above concentration limits. This reaction temperature data and solution pressure data suggest that the process has chemical reaction rate dependence and limitations. The observation of chemical reaction dependency indicates that the gas diffusion membrane apparatus is very effective at addressing mass transfer challenges.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of treating a switchable polarity material comprising:
   introducing a first feed stream comprising water and a non-polar form of the switchable polarity material to a first side of a gas diffusion membrane;
   introducing a second feed stream comprising an acid gas to a second side of the gas diffusion membrane opposing the first side of the gas diffusion membrane; and
   diffusing molecules of the acid gas of the second feed stream across the gas diffusion membrane and into the first feed stream to react with the water and the non-polar form of the switchable polarity material and form a product stream comprising a polar form of the switchable polarity material.

2. The method of claim 1, further comprising: selecting the non-polar form of the switchable polarity material of the first feed stream to comprise one or more of an amine compound, an amidine compound, and a guanidine compound.

3. The method of claim 2, wherein selecting the non-polar form of the switchable polarity material of the first feed stream to comprise one or more of an amine compound, an amidine compound, and a guanidine compound comprises selecting the non-polar form of the switchable polarity material to comprise a tertiary amine compound having a ratio of nitrogen to carbon within a range of from about 1:2 to about 1:15.

4. The method of claim 2, further comprising selecting the acid gas of the second feed stream to comprise one or more of carbon dioxide, carbon disulfide, and carbonyl sulfide.

5. The method of claim 2, wherein diffusing molecules of the acid gas of the second feed stream across the gas diffusion membrane and into the first feed stream to form a product stream comprising a polar form of the switchable polarity material comprises diffusing molecules of carbon dioxide across the gas diffusion membrane and into the first feed stream to form one or more an aminium bicarbonate, an aminium alkyl carbonate, an amidinium bicarbonate, an aminium alkyl carbonate, a guanidinium bicarbonate, and a guanidinium alkyl carbonate.

6. The method of claim 1, further comprising controlling one or more of a temperature, a pressure, and a flow rate of each of the first feed stream and the second feed stream to form greater than or equal to about 4.0 mol/kg of the polar form of the switchable polarity material in the product stream in less than or equal to about 4 hours.

7. The method of claim 1, further comprising selecting the gas diffusion membrane to exhibit a size, a shape, a material composition, and a porosity effectuating the diffusion of the molecules of the acid gas of the second feed stream into the first feed stream at a rate permitting the acid gas to substantially remain in solution with the water of the first feed stream until the formation of the non-polar form of the switchable polarity material.

8. The method of claim 1, further comprising selecting the gas diffusion membrane to comprise a substantially hydrophobic material formulated to prevent release of components thereof into the first feed stream.

9. The method of claim 8, further comprising selecting the gas diffusion membrane to further comprise at least one material that catalyzes the formation of the polar form of the switchable polarity material from the water and the non-polar form of the switchable polarity material of the first feed stream and the acid gas of the second feed stream.

10. The method of claim 1, wherein the first feed stream further comprises at least one additive comprising one or more of a homogeneous material and a heterogeneous material.

11. The method of claim 10, wherein diffusing molecules of the acid gas of the second feed stream across the gas diffusion membrane and into the first feed stream to form a product stream comprising a polar form of the switchable polarity material comprises forming the product stream to comprise a first phase comprising the polar form of the switchable polarity material and a second phase comprising the at least one additive.

12. The method of claim 1, further comprising recycling at least a portion of the product stream into the first feed stream upstream of the gas diffusion membrane.

13. The method of claim 1, further comprising:
introducing the product stream to a first side of an additional gas diffusion membrane downstream of the gas diffusion membrane;
introducing a third feed stream comprising the acid gas to a second side of the additional gas diffusion membrane opposing the first side of the additional gas diffusion membrane; and
diffusing molecules of the acid gas of the third feed stream across the additional gas diffusion membrane and into the product stream to form an additional product stream comprising a greater concentration of the polar form of the switchable polarity material than the product stream.

14. A treatment system for a switchable polarity material, comprising:
a source of a non-polar form of the switchable polarity material;
a source of an acid gas; and
a gas diffusion membrane apparatus in fluid communication with the source of the non-polar form of the switchable polarity material and the source of the acid gas and comprising a housing structure and a gas diffusion membrane within the housing structure, the gas diffusion membrane apparatus configured to separately receive the non-polar form of the switchable polarity material and the acid gas on opposing sides of the gas diffusion membrane and to diffuse molecules of the acid gas through the gas diffusion membrane to convert at least some of the non-polar form of the switchable polarity material and into a polar form of the switchable polarity material, the gas diffusion membrane comprising at least one hydrophobic material and at least one catalyst material formulated to promote the conversion of the non-polar form of the switchable polarity material into the polar form of the switchable polarity material.

15. The treatment system of claim 14, wherein:
the non-polar form of the switchable polarity material is selected from the group consisting of an amine compound, an amidine compound, and a guanidine compound; and
the acid gas comprises carbon dioxide.

16. The treatment system of claim 14, wherein the gas diffusion membrane exhibits one or more of a cuboidal shape and a tubular shape.

17. The treatment system of claim 14, wherein the gas diffusion membrane exhibits pores extending in tortuous paths throughout a thickness of the gas diffusion membrane, each of the pores independently exhibiting an average pore size of less than or equal to about 500 nanometers.

18. The treatment system of claim 14, further comprising an additional gas diffusion membrane apparatus downstream of the gas diffusion membrane and comprising an additional gas diffusion membrane within an additional housing structure, the additional gas diffusion membrane apparatus configured to receive the polar form of the switchable polarity material and any remaining non-polar form of the switchable polarity material exiting the gas diffusion membrane apparatus on a first side of the additional gas diffusion membrane and additional acid gas on a second, opposing side of the additional gas diffusion membrane, and to diffuse molecules of the additional acid gas through the additional gas diffusion membrane to convert at least some of the remaining non-polar form of the switchable polarity material and into an additional amount of the polar form of the switchable polarity material.

19. A method of liquid treatment, comprising:
delivering a multiphase mixture comprising a first phase comprising at least one liquid solvent and a second phase comprising one or more of an amine compound, an amidine compound, and a guanidine compound to a first side of a gas diffusion membrane;
delivering gaseous carbon dioxide to a second side of the gas diffusion membrane; and
diffusing molecules of the gaseous carbon dioxide through the gas diffusion membrane and into the multiphase mixture to react with the multiphase mixture and form one or more of an aminium bicarbonate, an aminium alkyl carbonate, an amidinium bicarbonate, an aminium alkyl carbonate, a guanidinium bicarbonate, and a guanidinium alkyl carbonate.

20. The method of claim 19, wherein delivering a multiphase mixture comprising at least one liquid solvent and one or more of an amine compound, an amidine compound, and a guanidine compound to a first side of a gas diffusion membrane comprises delivering a substantially homogeneous mixture of water and at least one tertiary amine to the first side of the gas diffusion membrane.

21. The method of claim 19, wherein diffusing molecules of the gaseous carbon dioxide through the gas diffusion membrane and into the multiphase mixture comprises:
maintaining a pressure differential across the gas diffusion membrane within a range of from about 1 psi to about 75 psi; and
maintaining a temperature of the mixture within a range of from about 10° C. to about 30° C. as the molecules of the gaseous carbon dioxide are diffused through the gas diffusion membrane and into the mixture.

22. The method of claim 19, further comprising selecting the gas diffusion membrane to comprise at least one hydrophobic material exhibiting pores extending in tortuous paths throughout a thickness thereof, each of the pores independently exhibiting an average pore size of less than or equal to about 500 nanometers.

23. The method of claim 19, further comprising selecting the multiphase mixture to further comprise at least one additive.

* * * * *

UNITED STATES PATENT AND TRADEMARK OFFICE
CERTIFICATE OF CORRECTION

PATENT NO. : 10,195,543 B2  
APPLICATION NO. : 15/177528  
DATED : February 5, 2019  
INVENTOR(S) : Aaron D Wilson et al.

Page 1 of 1

It is certified that error appears in the above-identified patent and that said Letters Patent is hereby corrected as shown below:

In the Specification

| Column 1, | Line 9, | change "DE-AC07-051D14517" to --DE-AC07-05ID14517-- |
| Column 16, | Line 14, | change "polymer a polyolefin," to --polymer (e.g., a polyolefin,-- |
| Column 16, | Line 16, | change "poly(terafluoroethylene) (PUT)," to --poly(terafluoroethylene) (PTFE),-- |

Signed and Sealed this  
Second Day of July, 2019

Andrei Iancu  
*Director of the United States Patent and Trademark Office*